Patented May 2, 1933

1,906,436

UNITED STATES PATENT OFFICE

OWEN A. THOMPSON, OF CUYAHOGA FALLS, OHIO, ASSIGNOR TO THE B. F. GOODRICH COMPANY, OF NEW YORK, N. Y., A CORPORATION OF NEW YORK

PROCESS OF SECURING RUBBER TO IRON OR STEEL

No Drawing.   Application filed September 18, 1930.   Serial No. 482,913.

This invention relates to the art of rubber manufacture and particularly to the permanent coating of iron or steel surfaces with an adherent layer of rubber.

It has heretofore been proposed to dip iron or steel articles in an aqueous solution of a copper salt, the iron effecting a reduction of the copper salt to metallic copper which forms a film over the surface of the iron. Rubber is then vulcanized in contact with the treated metal to cause it to adhere thereto. Although this prior process has met with some degree of success, it has not been possible thereby to secure a consistently good adhesion of the rubber to the metal. The failure of the process has been at least partly due to the practical impossibility in many cases of preventing the treated metallic surface from rusting during drying and before the rubber is applied. An object of this invention accordingly is to provide a superior method of effecting a permanently tenacious adhesion of rubber to iron or steel. Other objects will be apparent from the following description of the invention.

This invention, in brief, consists in treating iron or steel with a solution of a copper salt in a substantially anhydrous volatile solvent, and subsequently vulcanizing rubber in contact with the treated metal. For purpose of illustration a preferred manner of carrying out the invention is described below.

Hydrated copper chloride ($CuCl_2 \cdot 2H_2O$) is dissolved in strong alcohol (denatured 95-98% alcohol), forming a 10% solution. The iron or steel articles which are to be coated with rubber are cleaned free of grease and scale. Sandblasting is preferred to pickling since there is less opportunity for the bright metal to rust before the rubber is applied. The metal surface is then coated with the above solution of copper chloride by brushing the liquid over the surface with a paint brush. Alternatively the solution may be applied by dipping or spraying, but the brushing is preferred, since it assures intimate contact of the solution with the metal surface and agitates the film of liquid on the surface of the metal, promoting a rapid reaction of the copper chloride with the metallic iron in accordance with the following equation:

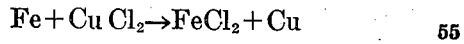

$$Fe + CuCl_2 \rightarrow FeCl_2 + Cu$$

The iron is rapidly covered with a bright continuous film of metallic copper, the iron chloride which is formed dissolving in the alcohol. As the alcohol evaporates, the iron chloride, together with the excess unreacted copper chloride, is left on the surface of the metal, tending to interfere with the subsequent adhesion of the rubber. It is therefore preferred to remove these salts by flushing the surface with alcohol or wiping it off with a rag or with cotton waste, which should be moistened with alcohol if the surface has been allowed to dry. After the evaporation of the alcohol the surface is left uniformly coated with a clean, bright, adherent film of copper, ready for the application of the rubber.

Although rubber may be vulcanized directly in contact with the coppered surface with good results, a somewhat better degree of adhesion and greater freedom from flaws such as blisters is secured by coating the metal first with a rubber cement. The most tenacious adhesion is obtained when the cement, in addition to rubber, contains a comparatively high proportion of sulphur and of an inert pigment, and preferably also a non-blooming softener. A suitable rubber cement contains approximately 45 parts by weight of rubber, 30 parts zinc oxide, 6.5 parts red iron oxide, 10 parts white factice, 8 parts sulphur, and 0.5 part organic accelerator. Other pigments such as whiting or lithopone may be substituted for the zinc oxide and red iron oxide, and other non-blooming softeners such as pine-tar, rosin, or light mineral oil may be substituted for the factice in the above recipe if desired. The ingredients are thoroughly mixed by mastication in the usual manner and dissolved in 600 parts gasoline. The resulting cement is evenly applied to the coppered surface of the iron or steel articles, say by brushing, spraying, or dipping. If a so-called "pure gum" rubber stock is to be applied to the metal several coats of the cement should be applied, but if the rubber stock, like the cement, contains a relatively high proportion of pigment a single coat may be sufficient.

The unvulcanized rubber which is to be secured to the metal may be applied in the form of calendered sheets which are carefully rolled on the cemented surface to eliminate all air pockets which would cause blisters to form during the vulcanization. Alternatively the rubber may be applied in the form of a liquid dispersion of rubber, for example by dipping the cemented articles in a vulcanizable rubber latex, either with or without the assistance of a coagulant. This modification is particularly advantageous in coating articles of irregular shapes, to which sheet rubber is not readily applied. The rubber-coated articles are then vulcanized in any suitable manner, say by heating in open steam, the pressure preferably being maintained in the vulcanizer after the completion of the vulcanization by admitting compressed air or cold water under pressure until the rubber is cool.

Rubber vulcanized to metal by the above process adheres so firmly that it cannot be torn loose. Unlike the adhesions obtained by many prior processes, the adhesion is not affected by either high or low temperatures. In fact, the rubber cannot be removed from the metal by any means short of utter destruction of the rubber.

The invention has been described above with reference to a single salt, copper chloride, but other copper salts may be substituted therefor. The salt must necessarily be one which is soluble in the organic solvent which is employed, and should also contain an acid radical which reacts with iron to form salts soluble in the same solvent. Otherwise the tendency to form a protective film of insoluble iron salt on the surface of the metal may largely prevent the deposition of the copper film. The copper halides in general have satisfactory properties.

The solvent employed is preferably substantially anhydrous so that no residue of water which would cause rusting will be left on the metal after evaporation. Ethyl alcohol in the range from about 80 to 100% concentration is satisfactory. Other volatile non-aqueous solvents which possess the power of dissociating electrolytes dissolved therein may likewise be employed. This includes primarily the volatile alcohols such as methyl alcohol, ethyl alcohol, isopropyl alcohol, and allyl alcohol, although other organic solvents such as acetone may be used under some conditions. The property of dissociating the electrolytes appears to be essential to the rapid reaction of the dissolved salts with the iron.

It will be understood that this invention is not limited to the specific methods or compositions hereinabove described; nor is it to be limited by any theories which may have been advanced herein for purposes of illustration and explanation. Numerous modifications may be introduced without exceeding the scope of the invention, hence it is intended to limit it only as may be required by the prior art and as indicated in the appended claims.

I claim:

1. The method of adhering rubber to iron or steel which comprises treating the metal with a solution of a copper salt in a volatile or organic solvent, and vulcanizing rubber in contact with the treated surface.

2. The method of adhering rubber to iron or steel which comprises treating the metal with a solution of a copper halide in a volatile, dissociating organic solvent, and vulcanizing rubber in contact with the treated surface.

3. The method of adhering rubber to iron or steel which comprises treating the metal with a solution of a copper halide in a substantially anhydrous, volatile, dissociating organic solvent until the metal is coated with a copper film, removing the metallic salts from the metal surface, permitting the evaporation of the solvent, and vulcanizing rubber in contact with the treated surface.

4. The method of adhering rubber to iron or steel which comprises treating the metal with a solution of a copper halide in a substantially anhydrous volatile alcohol until the metal is coated with a copper film, removing the metallic salts from the metal surface, and vulcanizing rubber in contact with the treated surface.

5. The method of adhering rubber to iron or steel which comprises treating the metal with a solution of a copper halide in a substantially anhydrous volatile alcohol until the metal is coated with a copper film, permitting the evaporation of the solvent, and vulcanizing rubber in contact with the treated surface under heat and pressure.

6. The method of adhering rubber to iron or steel which comprises treating the metal with a solution of copper chloride in a substantially anhydrous volatile alcohol until the metal is coated with a copper film, removing the metallic salts from the metal surface, permitting the evaporation of the solvent, and vulcanizing rubber in contact with the treated surface under heat and pressure.

7. A method as in claim 4, in which the treated surface is coated with a rubber cement before the rubber is applied.

8. A method as in claim 5, in which the treated surface is coated with a vulcanizable rubber cement before the rubber is applied.

9. A method as in claim 5, in which the treated surface is coated with a vulcanizable rubber cement containing appreciable proportions of inert pigment before the rubber is applied.

10. A method as in claim 5, in which the treated surface is coated with a vulcanizable rubber cement containing appreciable proportions of inert pigment and of sulphur before the rubber is applied.

11. A method as in claim 5, in which the treated surface is coated with a vulcanizable rubber cement containing appreciable proportions of inert pigment and of sulphur and a non-blooming softener before the rubber is applied.

12. A method as in claim 6, in which the treated surface is coated with a vulcanizable rubber cement containing appreciable proportions of inert pigment and of sulphur and a non-blooming softener before the rubber is applied.

In witness whereof I have hereunto set my hand this 15th day of September, 1930.

OWEN A. THOMPSON.